US010645406B2

(12) United States Patent
Jiang et al.

(10) Patent No.: US 10,645,406 B2
(45) Date of Patent: May 5, 2020

(54) TRANSCODING METHOD AND APPARATUS

(71) Applicant: Alibaba Group Holding Limited, Grand Cayman (KY)

(72) Inventors: Wenfei Jiang, Hangzhou (CN); Dawei Mei, Hangzhou (CN); Kaiyan Chu, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 29 days.

(21) Appl. No.: 16/003,029

(22) Filed: Jun. 7, 2018

(65) Prior Publication Data

US 2018/0295371 A1 Oct. 11, 2018

Related U.S. Application Data

(63) Continuation of application No. PCT/CN2016/107824, filed on Nov. 30, 2016.

(30) Foreign Application Priority Data

Dec. 9, 2015 (CN) .......................... 2015 1 0903889

(51) Int. Cl.
*H04N 7/12* (2006.01)
*H04N 19/40* (2014.01)
(Continued)

(52) U.S. Cl.
CPC ........... *H04N 19/40* (2014.11); *H04N 19/126* (2014.11); *H04N 19/132* (2014.11);
(Continued)

(58) Field of Classification Search
CPC .. H04N 19/126; H04N 19/132; H04N 19/146; H04N 19/184; H04N 19/30; H04N 19/40
(Continued)

(56) References Cited

U.S. PATENT DOCUMENTS 8,290,038 B1 * 10/2012 Wang ................... H04N 19/139
375/240.02
8,767,825 B1 * 7/2014 Wang ................... H04N 19/172
375/240.1
(Continued)

FOREIGN PATENT DOCUMENTS

CN 102148961 A 8/2011
CN 103220550 7/2013
(Continued)

OTHER PUBLICATIONS

The Extended European Search Report dated May 2, 2019 for European Patent Application No. 16872342.7, 11 pages.
(Continued)

*Primary Examiner* — Gims S Philippe
(74) *Attorney, Agent, or Firm* — Lee & Hayes, P.C.

(57) ABSTRACT

A method including selecting a first definition and a second definition from multiple levels of definition, and determining a first resolution and a second resolution that respectively correspond to the first definition and the second definition; transcoding a first part of content of a media file based on the first resolution and the second resolution and according to a preset transcoding rule, and recording a first real-time quantization parameter (QP) value and a second real-time QP value in the transcoding process; determining whether the first real-time QP value and the second real-time QP value meet a preset detection rule; if the determining result is no, adjusting the first resolution and/or adjusting the second resolution; and transcoding the non-transcoded part in the media file according to the adjusted first resolution and/or second resolution. The transcoding method and apparatus increase the transcoding speed of a media file.

20 Claims, 3 Drawing Sheets

(51) Int. Cl.

| | | |
|---|---|---|
| *H04N 19/184* | (2014.01) | |
| *H04N 21/845* | (2011.01) | |
| *H04N 19/59* | (2014.01) | |
| *H04N 21/2343* | (2011.01) | |
| *H04N 19/436* | (2014.01) | |
| *H04N 19/146* | (2014.01) | |
| *H04N 19/132* | (2014.01) | |
| *H04N 19/126* | (2014.01) | |
| *H04N 19/30* | (2014.01) | |

(52) U.S. Cl.
CPC ......... *H04N 19/146* (2014.11); *H04N 19/184* (2014.11); *H04N 19/30* (2014.11); *H04N 19/436* (2014.11); *H04N 19/59* (2014.11); *H04N 21/23439* (2013.01); *H04N 21/234309* (2013.01); *H04N 21/234363* (2013.01); *H04N 21/8456* (2013.01)

(58) Field of Classification Search
USPC .......................... 375/240.16, 240.02, 240.03
See application file for complete search history.

(56) References Cited

U.S. PATENT DOCUMENTS

| | | | |
|---|---|---|---|
| 8,902,973 | B2 | 12/2014 | Yang et al. |
| 8,908,758 | B2* | 12/2014 | Leontaris ............. H04N 19/597 |
| | | | 375/240.01 |
| 9,215,466 | B2* | 12/2015 | Zhai ....................... H04N 19/61 |
| 9,615,098 | B1* | 4/2017 | Yi ......................... H04N 19/132 |
| 2008/0219356 | A1 | 9/2008 | Johar et al. |
| 2012/0294355 | A1 | 11/2012 | Holcomb et al. |
| 2013/0094564 | A1 | 4/2013 | Yang et al. |
| 2013/0094565 | A1* | 4/2013 | Yang .................... H04N 19/105 |
| | | | 375/240.02 |
| 2013/0322524 | A1* | 12/2013 | Jang ....................... H04N 19/30 |
| | | | 375/240.03 |
| 2014/0139733 | A1 | 5/2014 | MacInnis et al. |
| 2015/0256840 | A1* | 9/2015 | Sato ..................... H04N 19/186 |
| | | | 375/240.03 |

FOREIGN PATENT DOCUMENTS

| | | |
|---|---|---|
| CN | 104581169 | 4/2015 |
| CN | 105100800 | 11/2015 |
| EP | 2476256 A1 | 3/2013 |
| WO | WO2013033334 | 3/2013 |
| WO | WO2015183910 | 12/2015 |

OTHER PUBLICATIONS

Translation of International Search Report from corresponding PCT application No. PCT/CN2016/107824 dated Feb. 9, 2017, 2 pages.
Thomson, et al., "Calvin: Fast Distributed Transactions for Partitioned Database Systems", SIGMOD '12 Proceedings of the 2012 ACM SIGMOD International Conference on Management of Data, May 20-24, 2012, pp. 1-12.
Translation of Written Opinion from corresponding PCT application No. PCT/CN2016/107824 dated Feb. 9, 2017, 4 pages.
Translation of Office Action dated Feb. 2, 2019, from CN Patent Application No. 201510903889, 6 pages.
Translation of Search Report dated Jan. 25, 2019, from CN Patent Application No. 201510903889, 2 pages.

* cited by examiner

TRANSCODING METHOD AND APPARATUS

CROSS REFERENCE TO RELATED PATENT APPLICATIONS

This application claims priority to and is a continuation of PCT Patent Application No. PCT/CN2016/107824, filed on 30 Nov. 2016, which claims priority to Chinese Patent Application No. 201510903889.9 filed on 9 Dec. 2015 and entitled "TRANSCODING METHOD AND APPARATUS", which are incorporated herein by reference in their entirety.

TECHNICAL FIELD

The present disclosure relates to the field of information processing technologies, and, more particularly, to transcoding methods and apparatuses.

BACKGROUND

With the continuous development of mobile communications technologies, the rapid increase in network access speed, the development of intelligent mobile terminals, and the ever-increasing optimization of digital compression technologies, mobile terminals have evolved from a simple communication and contact tool to an intelligent multimedia platform. Mobile streaming media is a combination of mobile communication and streaming media transmission. By using streaming media technology to transmit data on mobile terminals via a mobile network, services including video on demand, mobile video chat, and mobile video surveillance are provided to users.

Transcoding is a process in which high-definition ultra-large media files (for example, video files) are compressed into files/flows that are suitable for being played back in some network scenarios (for example, a fiber network, a WIFI network, a 3G network, and the like) or on some terminals (for example, a television, a PC, a mobile phone, a PAD, and the like). Generally, a smaller compressed media file is more suitable for being transmitted in a bandwidth-limited environment, but has poorer image display quality.

An existing transcoding method generally includes: pre-setting transcoding parameters corresponding to different levels of definition, such that the definition may include the following four levels: smooth, standard definition, high definition and ultra-high definition, and then resolutions and bit-rates that correspond to the four levels of definition may be respectively set; precoding and transcoding a media file based on different levels of definition and according to the set resolutions and bit-rates; and after transcoding based on each level of definition is completed, outputting a media file corresponding to the definition.

The conventional techniques have at least the following problems: in the existing transcoding method, transcoding parameters of a media file need to be analyzed before transcoding, to determine appropriate transcoding parameters such as resolutions and bit-rates. Then, the media file is transcoded according to the parameters obtained after the analysis, and the transcoded media file is output. Generally, a process of analyzing the parameters needs a certain period of time. When a media file needs to be transcoded into media files at different levels of definition, parameters for each level of definition are required to be analyzed, thereby consuming lots of time and reducing the transcoding speed.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The present disclosure provides transcoding methods and apparatuses to increase the transcoding speed of a media file.

To solve the foregoing technical problems, the transcoding methods and apparatuses provided by the example embodiments of the present disclosure are implemented as follows:

A transcoding method is provided, which includes:
pre-establishing a correspondence between multiple different levels of definition and resolutions;
selecting a first definition and a second definition from the multiple levels of definition, and determining a first resolution and a second resolution that respectively correspond to the first definition and the second definition;
transcoding a first part of content of a media file based on the first resolution and the second resolution and according to a preset transcoding rule, and recording a first real-time quantization parameter (QP) value and a second real-time QP value that respectively correspond to the first definition and the second definition in the transcoding process;
determining whether the first real-time QP value and the second real-time QP value meet a preset detection rule;
adjusting the first resolution corresponding to the first definition if the first real-time QP value does not meet the preset detection rule; and/or adjusting the second resolution corresponding to the second definition if the second real-time QP value does not meet the preset detection rule; and
transcoding the non-transcoded part in the media file according to the adjusted first resolution and/or second resolution.

A transcoding method is provided, which includes:
selecting a first definition and a second definition from multiple levels of definition, and determining a first resolution and a second resolution that respectively correspond to the first definition and the second definition;
transcoding a first part of content of a media file based on the first resolution and the second resolution and according to a preset transcoding rule, and recording a first real-time QP value and a second real-time QP value that respectively correspond to the first definition and the second definition in the transcoding process;
determining whether the first real-time QP value and the second real-time QP value meet a preset detection rule;
adjusting the first resolution corresponding to the first definition if the first real-time QP value does not meet the preset detection rule; and/or adjusting the second resolution corresponding to the second definition if the second real-time QP value does not meet the preset detection rule; and
transcoding the non-transcoded part in the media file according to the adjusted first resolution and/or second resolution.

A transcoding apparatus is provided, which includes: a correspondence establishment module, a definition and resolution determining module, a transcoding module, a first determination module, and a first resolution adjusting module, wherein:
the correspondence establishment module is configured to pre-establish a correspondence between multiple different levels of definition and resolutions;

the definition and resolution determining module is configured to select a first definition and a second definition from the multiple levels of definition, and determine a first resolution and a second resolution that respectively correspond to the first definition and the second definition;

the transcoding module is configured to transcode a first part of content of a media file based on the first resolution and the second resolution and according to a preset transcoding rule, and record a first real-time QP value and a second real-time QP value that respectively correspond to the first definition and the second definition in the transcoding process;

the first determination module is configured to determine whether the first real-time QP value and the second real-time QP value meet a preset detection rule, the preset detection rule including: the number of QP values greater than a first threshold in real-time QP values obtained by transcoding based on a resolution being less than a % of the total number of the real-time QP values obtained by transcoding based on the resolution, a ranging from 30 to 70;

the first resolution adjusting module is configured to adjust the first resolution corresponding to the first definition if the determination result of the first determination module is that the first real-time QP value does not meet the preset detection rule; and/or adjust the second resolution corresponding to the second definition if the determination result of the first determination module is that the second real-time QP value does not meet the preset detection rule; and the transcoding module is further configured to transcode the non-transcoded part in the media file according to the first resolution and/or second resolution adjusted by the first resolution adjusting module.

A transcoding apparatus is provided, which includes: a definition and resolution determining module, a transcoding module, a first determination module, and a first resolution adjusting module, wherein:

the definition and resolution determining module is configured to select a first definition and a second definition from multiple levels of definition, and determine a first resolution and a second resolution that respectively correspond to the first definition and the second definition;

the transcoding module is configured to transcode a first part of content of a media file based on the first resolution and the second resolution and according to a preset transcoding rule, and record a first real-time QP value and a second real-time QP value that respectively correspond to the first definition and the second definition in the transcoding process;

the first determination module is configured to determine whether the first real-time QP value and the second real-time QP value meet a preset detection rule, the preset detection rule including: the number of QP values greater than a first threshold in real-time QP values obtained by transcoding based on a resolution being less than a % of the total number of the real-time QP values obtained by transcoding based on the resolution, a ranging from 30 to 70;

the first resolution adjusting module is configured to adjust the first resolution corresponding to the first definition if the determination result of the first determination module is that the first real-time QP value does not meet the preset detection rule; and/or adjust the second resolution corresponding to the second definition if the determination result of the first determination module is that the second real-time QP value does not meet the preset detection rule; and the transcoding module is further configured to transcode the non-transcoded part in the media file according to the first resolution and/or second resolution adjusted by the first resolution adjusting module.

As shown from the foregoing technical solutions provided by the example embodiments of the present disclosure, in the transcoding method and apparatus provided by the example embodiments of the present disclosure, part of content of a media file is transcoded according to a predetermined resolution corresponding to a definition, and it is unnecessary to analyze transcoding parameters for each level of definition before the transcoding, thus reducing the transcoding time and increasing the transcoding speed. Moreover, a variation in a QP value is recorded in the transcoding process. When the QP value is excessively large, the resolution is timely adjusted, and the non-transcoded part in the media file is transcoded according to the adjusted resolution, such that the transcoded media file is clearly and smoothly played back.

BRIEF DESCRIPTION OF THE DRAWINGS

To describe the technical solutions in the example embodiments of the present disclosure more clearly, the following briefly introduces the accompanying drawings for describing the example embodiments. Apparently, the accompanying drawings in the following description merely show some example embodiments of the present disclosure, and those of ordinary skill in the art may still derive other drawings from these accompanying drawings without creative efforts.

DETAILED DESCRIPTION

The example embodiments of the present disclosure provide a transcoding method and apparatus.

To enable those skilled in the art better understand the technical solutions of the present disclosure, the technical solutions in the example embodiments of the present disclosure will be clearly and completely described below with reference to the accompanying drawings in the example embodiments of the present disclosure. Apparently, the described example embodiments represent some rather than all the example embodiments of the present disclosure. Based on the example embodiments of the present disclosure, other example embodiments acquired by those of ordinary skill in the art without creative effort all belong to the protection scope of the present disclosure.

Figure 1:
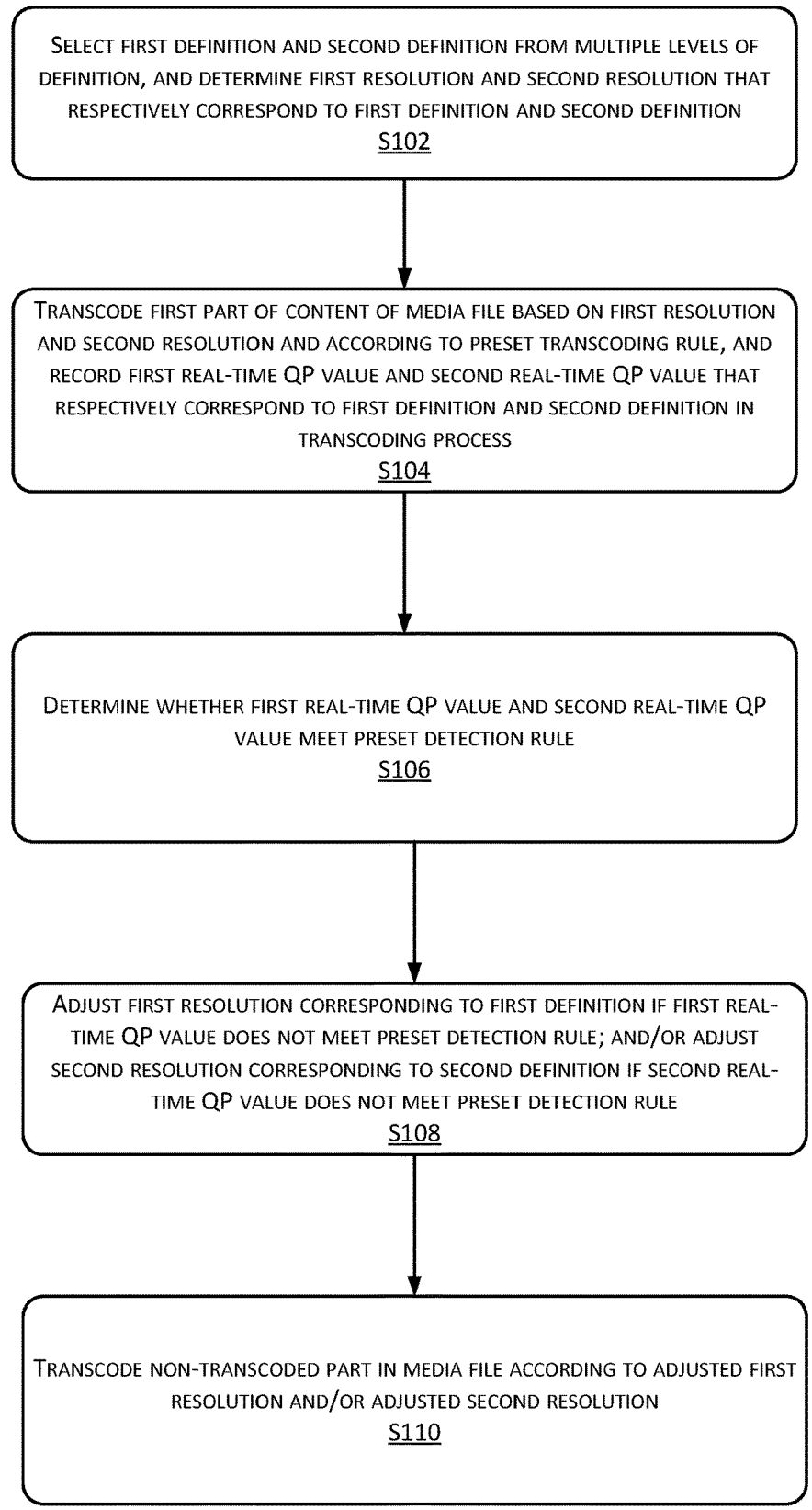
FIG. 1 is a flowchart of a transcoding method according to an example embodiment of the present disclosure.

FIG. 1 is a flowchart of a transcoding method according to an example embodiment of the present disclosure. As shown in FIG. 1, the transcoding method may include the following steps.

S102: A first definition and a second definition are selected from multiple levels of definition, and a first resolution and a second resolution that respectively correspond to the first definition and the second definition are determined.

The multiple levels of definition may be at least two levels of definition. A correspondence between the multiple levels of definition and resolutions may be set.

For example, the correspondence between the different levels of definition and resolutions may be shown in FIG. 1. The multiple levels of definition may be four levels of definition, which may be successively as follows from the highest to the lowest: ultra-high definition, high definition, standard definition, and smooth.

TABLE 1

Levels of definition and their corresponding resolutions

| Definition | Resolution |
|---|---|
| Ultra-high definition | 1920 × 1080 |
| High definition | 1280 × 720 |
| Standard definition | 848 × 480 |
| Smooth | 576 × 320 |

A first definition and a second definition may be selected from the multiple levels of definition.

When the multiple levels of definition are two levels of definition, the first definition may be either of the two levels of definition, and the second definition may be the other one.

When the multiple levels of definition are three or more levels of definition, the first definition and the second definition may be any two levels of definition except the highest level of definition in the multiple levels of definition. For example, the multiple levels of definition from the highest to the lowest may be successively as follows: ultra-high definition, high definition, standard definition, and smooth. Then, the first definition and the second definition may be any two among "high definition", "standard definition", and "smooth".

Further, when the multiple levels of definition are four or more levels of definition, two non-adjacent levels of definition may be selected as the first definition and the second definition. For example, the levels "high definition" and "smooth" may be selected.

A first resolution and a second resolution that respectively correspond to the first definition and the second definition may be determined according to the pre-established correspondence between the different levels of definition and the resolutions.

S104: A first part of content of a media file is transcoded based on the first resolution and the second resolution and according to a preset transcoding rule, and a first real-time QP value and a second real-time QP value that respectively correspond to the first definition and the second definition are recorded in the transcoding process.

The first part of content of the media file may be transcoded based on the first resolution and the second resolution and according to the preset transcoding rule.

The first part of content of the media file may include content lasting a first duration in the media file, where the first duration may be less than a total playback duration of the media file. For example, for a 30-minute video file, the content lasting the first duration may be content in 2 minutes starting from the current time.

The preset transcoding rule may include: encoding according to a constant rate factor (CRF) value or a constant QP value. In a general case, a CRF value of 18 indicates that a media file has basically lossless quality, a CRF value ranging from 19 to 21.5 indicates that the media file has high quality, and a CRF value ranging from 22 to 26 indicates that the media file has medium quality.

The preset rate factor may be selected according to an actual experimental situation. For example, the CRF value may be 25.

The QP value may be used to measure a distortion degree/compression ratio of the transcoded media file. A larger QP value indicates a higher distortion degree and a higher compression ratio of the transcoded media file. A smaller QP value indicates a lower distortion degree and a lower compression ratio of the transcoded media file.

Generally, the QP value ranges from 0 to 51. A common Internet video file has relatively poor quality if QP>35.

A first real-time QP value and a second real-time QP value that respectively correspond to the first definition and the second definition may be recorded in the transcoding process.

S106: Whether the first real-time QP value and the second real-time QP value meet a preset detection rule are determined.

It may be determined whether the first real-time QP value and the second real-time QP value meet a preset detection rule.

The preset detection rule may include: the number of QP values greater than a first threshold in real-time QP values obtained by transcoding based on a resolution being less than a % of the total number of the real-time QP values obtained by transcoding based on the resolution, a ranging from 30 to 70.

It may be determined, by comparing whether the real-time QP value is greater than the first threshold, whether an instantaneous bit-rate value is excessively high in the transcoding process.

The first threshold may be a constant QP value, or a QP value corresponding to the CRF value. For example, when the preset transcoding rule is encoding according to the CRF value, the first threshold may be the preset rate factor value plus 5. In a general case, when the QP value obtained after the transcoding is greater than the first threshold, it may indicate that an instantaneous bit-rate value is greater than a maximum bit-rate value by which the media file may be smoothly played back at a current resolution. If more than a certain number of instantaneous bit-rate values are greater than the maximum bit-rate value, the media file probably cannot be smoothly played back at the current resolution.

S108: The first resolution corresponding to the first definition is adjusted if the first real-time QP value does not meet the preset detection rule; and/or the second resolution corresponding to the second definition is adjusted if the second real-time QP value does not meet the preset detection rule.

When there are a lot of QP values that are greater than the first threshold, it indicates that when transcoding is performed at the current resolution according to the preset transcoding rule, instantaneous bit-rates of multiple clips of the media file probably exceed the maximum bit-rate at the resolution, and the media file probably cannot be smoothly played back. Therefore, the resolution corresponding to the current definition needs to be degraded.

The step of adjusting the first resolution may include: multiplying a value of the first resolution by a first factor. The step of adjusting the second resolution may include: multiplying a value of the second resolution by a first factor. A value of the first factor may be greater than 0 and less than 1. For example, the first factor may be equal to 0.8.

S110: The non-transcoded part in the media file is transcoded according to the adjusted first resolution and/or second resolution.

Based on the adjusted first resolution and/or second resolution, the non-transcoded part in the media file may be transcoded according to the preset transcoding rule, to obtain a new first bit-rate and a new second bit-rate that respectively correspond to the first definition and the second definition.

In another implementation, the method may further include: if the first real-time QP value and the second real-time QP value both meet the preset detection rule, the non-transcoded part in the media file is transcoded according to the first resolution and the second resolution. When the first real-time QP value and the second real-time QP value both meet the preset detection rule, it may indicate that the number of QP values greater than the first threshold is 0 or is relatively small. As such, when transcoding is performed according to the preset transcoding rule at the current resolution, the media file has no clip or a few clips of which instantaneous bit-rate values exceed the maximum bit-rate value at the resolution, ensuring smooth playback of the media file. Therefore, the non-transcoded part in the media file may be transcoded according to the first resolution and the second resolution.

In another implementation, the method may further include: recording a first bit-rate and a second bit-rate that are obtained by transcoding the first part of content of the media file, the first bit-rate and the second bit-rate respectively corresponding to the first definition and the second definition; and establishing a linear model according to the first bit-rate and the second bit-rate that respectively correspond to the first definition and the second definition, and according to the first resolution and the second resolution.

Further, when the multiple levels of definition are at least three levels of definition, bit-rate values corresponding to other levels of definition except for the first definition and the second definition in the multiple levels of definition are determined according to the linear model and resolutions corresponding to the other levels of definition.

For example, a linear relationship between the resolution and the bit-rate may be calculated according to the first and second resolutions and the first and second bit-rates. Then, the bit-rate values corresponding to the resolutions that correspond to the other levels of definition may be calculated according to the linear relationship. Bit-rates corresponding to the other levels of definition may be directly and rapidly determined by using the linear model, and thus corresponding bit-rate values may be obtained without the need of transcoding the media file according to resolutions corresponding to different levels of definition, improving the processing efficiency.

Further, it may be determined whether a bit-rate value corresponding to each level of definition is less than or equal to a preset upper-limit bit-rate threshold corresponding to this level of definition. If the determination result is no, a target level of definition for which a bit-rate value is greater than the upper-limit bit-rate threshold may be determined in the multiple levels of definition. An adjusted resolution corresponding to the target level of definition may be determined by using the linear model and according to the upper-limit bit-rate threshold corresponding to the target level of definition. The non-transcoded part in the media file may be transcoded according to the adjusted resolution. Smooth playback of the media file may be ensured by controlling the bit-rate value in the transcoding process not to be greater than the upper-limit bit-rate threshold. Moreover, a resolution matching a bit-rate value by which the media file may be smoothly played back at each level of definition may be obtained by using the linear model, such that the transcoded media file may be clearly and smoothly played back.

Figure 2:
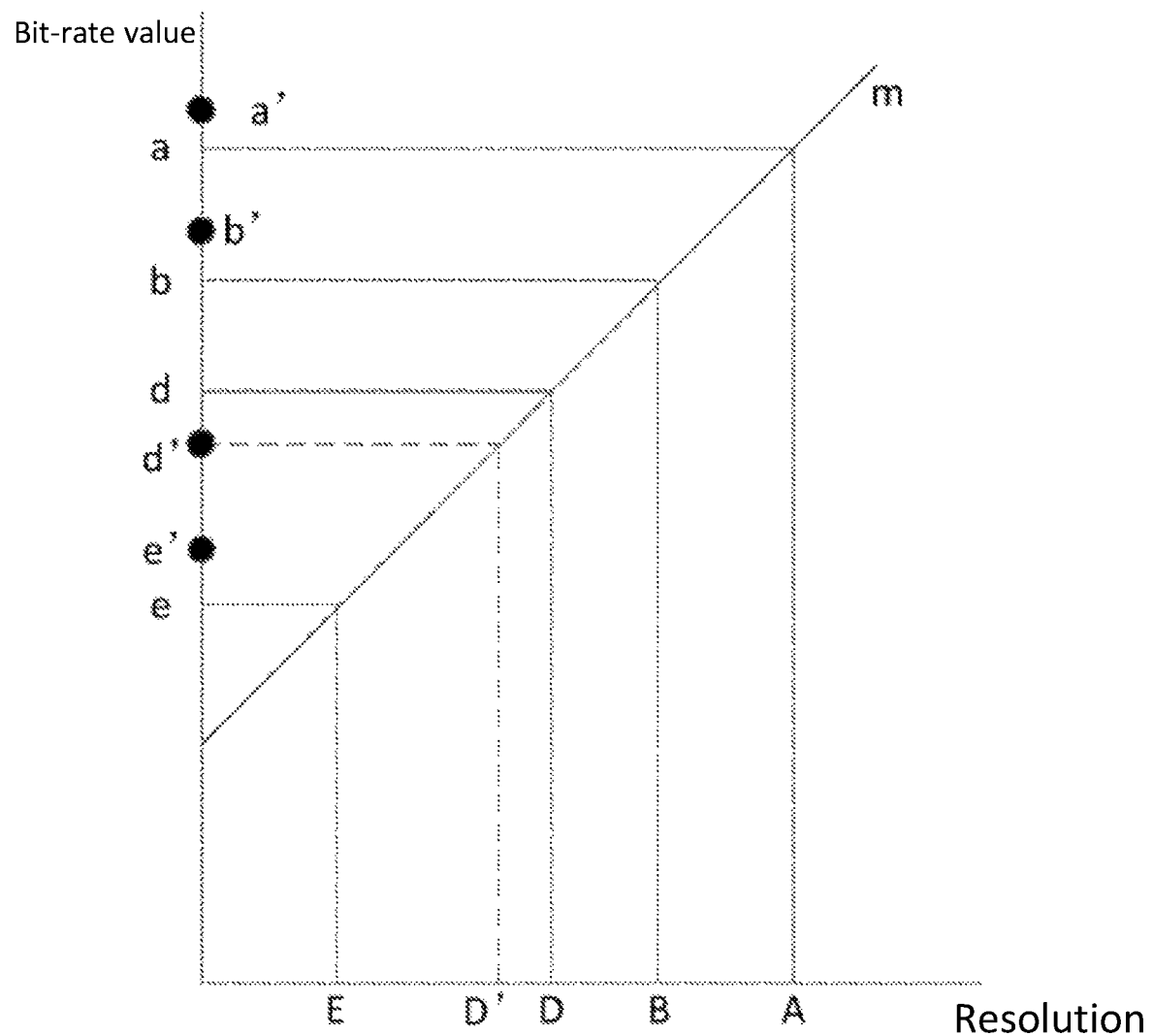
FIG. 2 is a schematic diagram of adjusting resolutions by using a linear model in a transcoding method according to an example embodiment of the present disclosure.

FIG. 2 is a schematic diagram of adjusting resolutions by using a linear model in a transcoding method according to an example embodiment of the present disclosure. As shown in FIG. 2, B and E respectively represent a first resolution and a second resolution that respectively correspond to "high definition" and "smooth" and are obtained according to Table 1. In FIG. 2, A represents a resolution that corresponds to "ultra-high definition" and is obtained according to Table 1, D represents a resolution that corresponds to "standard definition" and is obtained according to Table 1, b represents a first bit-rate value obtained in the transcoding process, and e represents a second bit-rate value obtained in the transcoding process.

Figure 3:
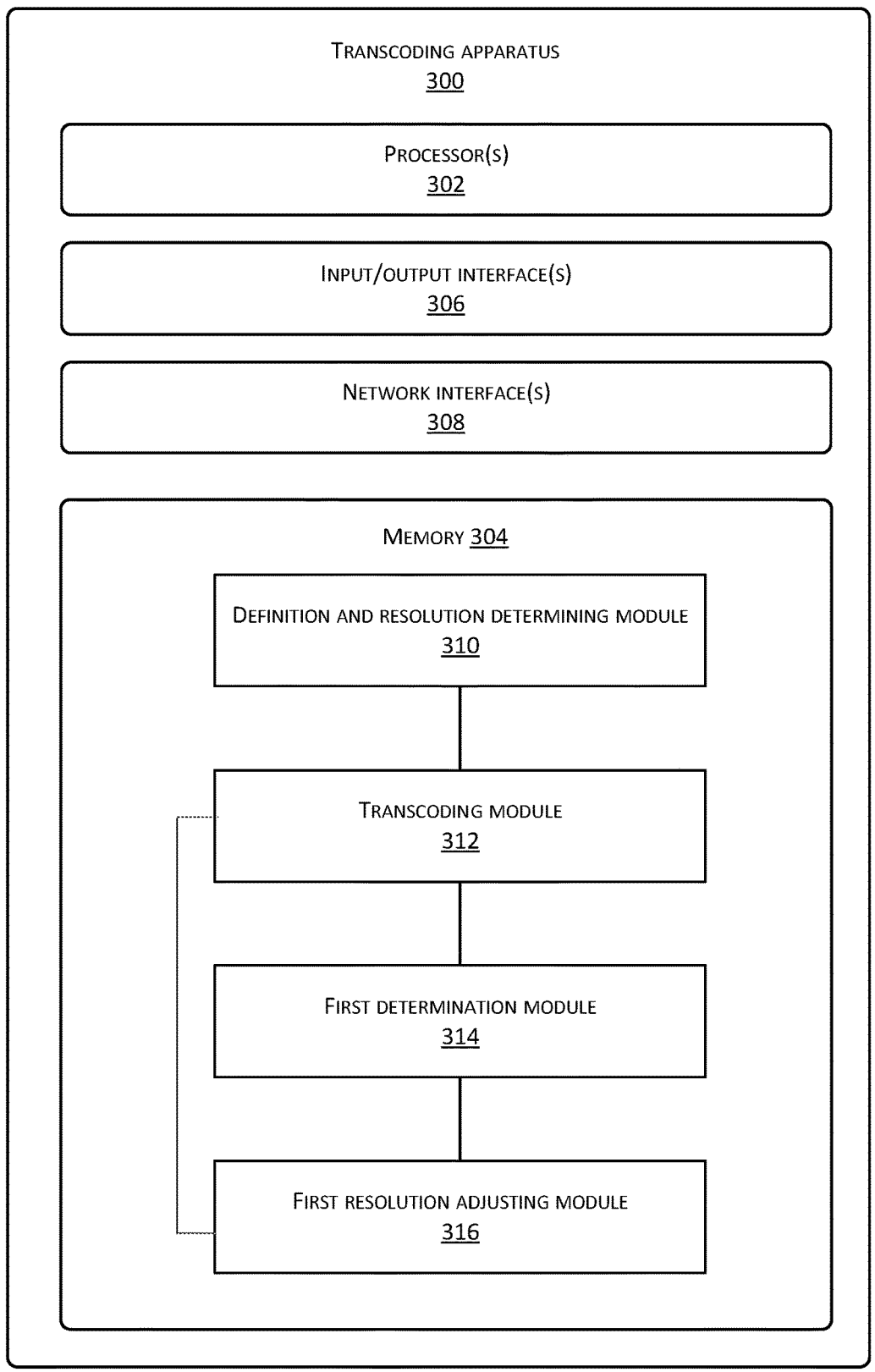
FIG. 3 is a modular diagram of a transcoding apparatus according to an example embodiment of the present disclosure.

As such, a linear model may be established according to B, E, b and e, to obtain a linear relationship between a resolution and a bit-rate, which is shown by a line m in FIG. 3. A bit-rate value a corresponding to the resolution A and a bit-rate value d corresponding to the resolution D may be obtained by using the linear model. It is supposed that a', b', d' and e' are preset bit-rate thresholds that respectively correspond to "ultra-high definition", "high definition", "standard definition", and "smooth". Then, it may be known through determination that only if d>d', the media file cannot be smoothly played back if the media file at the resolution D is transcoded to implement playback in "standard definition". In this case, a resolution D' corresponding to the upper-limit bit-rate value d' that corresponds to "standard definition" may be obtained according to d' and by using the linear model. D' is used as an adjusted resolution corresponding to the "standard definition". When the non-transcoded part in the media file is transcoded according to the adjusted D', it may be ensured that the media file is clearly and smoothly played back.

In the transcoding method provided by the foregoing example embodiment, part of content of a media file is transcoded according to a predetermined resolution corresponding to a definition, and it is unnecessary to analyze transcoding parameters for each level of definition before the transcoding, thus reducing the transcoding time and increasing the transcoding speed. Moreover, a variation in a QP value is recorded in the transcoding process. When the QP value is excessively large, the resolution may be adjusted in a timely fashion, and the non-transcoded part in the media file is transcoded according to the adjusted resolution, such that the transcoded media file may be clearly and smoothly played back.

FIG. 3 is a modular diagram of a transcoding apparatus 300 according to an example embodiment of the present disclosure. As shown in FIG. 3, the transcoding apparatus 300 includes one or more processor(s) 302 or data processing unit(s) and memory 304. The transcoding apparatus 300 may further include one or more input/output interface(s) 306 and one or more network interface(s) 308. The memory 304 is an example of computer readable media.

The memory 304 may store therein a plurality of modules or units including a definition and resolution determining module 310, a transcoding module 312, a first determination module 314, and a first resolution adjusting module 316.

The definition and resolution determining module 310 may be configured to select a first definition and a second definition from multiple levels of definition, and determine a first resolution and a second resolution that respectively correspond to the first definition and the second definition. The multiple levels of definition may be at least two levels of definition. A correspondence establishment module may be used to set a correspondence between the multiple levels of definition and resolutions.

The transcoding module 312 may be configured to transcode a first part of content of a media file based on the first resolution and the second resolution and according to a preset transcoding rule, and record a first real-time QP value and a second real-time QP value that respectively correspond to the first definition and the second definition in the transcoding process.

The first determination module 314 may be configured to determine whether the first real-time QP value and the second real-time QP value meet a preset detection rule, the preset detection rule including: the number of QP values greater than a first threshold in real-time QP values obtained by transcoding based on a resolution being less than a % of the total number of the real-time QP values obtained by transcoding based on the resolution, a ranging from 30 to 70.

The first resolution adjusting module 316 may be configured to adjust the first resolution corresponding to the first definition if the determination result of the first determination module 314 is that the first real-time QP value does not meet the preset detection rule; and/or adjust the second resolution corresponding to the second definition if the determination result of the first determination module 304 is that the second real-time QP value does not meet the preset detection rule.

The transcoding module 312 may be further configured to transcode the non-transcoded part in the media file according to the first resolution and/or second resolution adjusted by the first resolution adjusting module 316.

In another implementation, the transcoding apparatus 300 may further include a bit-rate recording module and a linear model establishment module (both are not shown in FIG. 3). The bit-rate recording module may be configured to record a first bit-rate and a second bit-rate that are obtained after the transcoding module transcodes the first part of content of the media file, the first bit-rate and the second bit-rate respectively corresponding to the first definition and the second definition. The linear model establishment module may be configured to establish a linear model according to the first bit-rate and the second bit-rate that respectively correspond to the first definition and the second definition, and according to the first resolution and the second resolution.

Further, the transcoding apparatus 300 may further include a module for determining other bit-rates (not shown in FIG. 3), which may be configured to determine bit-rate values corresponding to other levels of definition except for the first definition and the second definition in the multiple levels of definition according to the linear model and resolutions corresponding to the other levels of definition.

In another implementation, the transcoding apparatus 300 may further include: a second determination module (not shown in FIG. 3), which may be configured to determine whether a bit-rate value corresponding to each level of definition is less than or equal to a preset upper-limit bit-rate threshold corresponding to this level of definition.

Further, when the determination result of the second determination module is no, the transcoding apparatus 300 may further include a module for determining a target level of definition, and a second resolution adjustment module (both are not shown in FIG. 3).

The module for determining a target level of definition may be configured to determine a target level of definition for which a bit-rate value is greater than the corresponding preset upper-limit bit-rate threshold in the multiple levels of definition.

The second resolution adjustment module may be configured to determine an adjusted resolution corresponding to the target level of definition by using the linear model and according to the upper-limit bit-rate threshold corresponding to the target level of definition.

Correspondingly, the transcoding module 312 may be further configured to transcode the non-transcoded part in the media file according to the resolution adjusted by the second resolution adjustment module.

The transcoding apparatus disclosed in the foregoing example embodiment is corresponding to the example embodiment of the transcoding method of the present disclosure, and may implement the method example embodiment of the present disclosure and achieve the technical effects of the method example embodiment.

In the 1990s, an improvement on a technology may be obviously distinguished as an improvement on hardware (for example, an improvement on a circuit structure such as a diode, a transistor, and a switch) or an improvement on software (an improvement on a method procedure). However, with the development of technologies, improvements of many method procedures at present may be considered as direct improvements on hardware circuit structures. Almost all designers program improved method procedures into hardware circuits to obtain corresponding hardware circuit structures. Therefore, it is improper to assume that the improvement of a method procedure cannot be implemented by using a hardware entity module. For example, a Programmable Logic Device (PLD) (for example, a Field Programmable Gate Array (FPGA)) is such an integrated circuit whose logic functions are determined by devices programmed by a user. Designers program by themselves to "integrate" a digital system into a piece of PLD, without the need to ask a chip manufacturer to design and manufacture a dedicated integrated circuit chip 2. Moreover, at present, the programming is mostly implemented by using logic compiler software, instead of manually manufacturing an integrated circuit chip. The logic compiler software is similar to a software complier used for developing and writing a program, and original codes before compiling also needs to be written by using a programming language, which is referred to as a Hardware Description Language (HDL). There are many types of HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, and Ruby Hardware Description Language (RHDL), among which Very-High-Speed Integrated Circuit Hardware Description Language (VHDL) and Verilog2 are most commonly used now. Those skilled in the art also should know that a hardware circuit for implementing the logic method procedure may be easily obtained by slightly logically programming the method procedure using the above several hardware description languages and programming it into an integrated circuit.

A controller may be implemented in any suitable manner. For example, the controller may be in the form of, for example, a microprocessor or a processor and a computer readable medium storing a computer readable program code (for example, software or firmware) executable by the (micro)processor, a logic gate, a switch, an Application Specific Integrated Circuit (ASIC), a programmable logic controller, and an embedded micro-controller. Examples of the controller include, but are not limited to, the following micro-controllers: ARC 625D, Atmel AT91SAM, Microchip PIC18F26K20, and Silicone Labs C8051F320. A memory controller may also be implemented as a part of control logic of a memory.

Those skilled in the art also know that the controller may be implemented by using pure computer readable program codes, and in addition, the method steps may be logically programmed to enable the controller to implement the same function in a form of a logic gate, a switch, an application-specific integrated circuit, a programmable logic controller and an embedded microcontroller. Therefore, this type of controller may be considered as a hardware component, and apparatuses included therein for implementing various functions may also be considered as structures inside the hardware component. Or, the apparatuses used for implementing various functions may even be considered as both software modules for implementing the method and structures inside the hardware component.

The system, apparatus, module or unit illustrated in the above example embodiments may be implemented by using a computer chip or an entity, or a product having a certain function.

For ease of description, when the apparatus is described, it is divided into various units in terms of functions for respective descriptions. Certainly, when the present disclosure is implemented, functions of the units may be implemented in the same or multiple pieces of software and/or hardware.

It may be seen from the description of the foregoing implementations that those skilled in the art may clearly understand that the present disclosure may be implemented by means of software plus a necessary universal hardware platform. Based on such understanding, the technical solution of the present disclosure essentially or the part contributing to the conventional techniques may be embodied in the form of a software product. In a typical configuration, a computing device includes one or more processors (CPU), an input/output interface, a network interface, and a memory. The computer software product may include instructions for instructing a computer device (which may be a personal computer, a server, or a network device, etc.) to perform the methods described in the various example embodiments or some parts of the example embodiments of the present disclosure. The computer software product may be stored in a memory. The memory may include a volatile memory, a random access memory (RAM) and/or a non-volatile memory or the like in a computer readable medium, for example, a read-only memory (ROM) or a flash memory (flash RAM). The memory is an example of the computer readable medium. The computer readable medium includes non-volatile and volatile media as well as movable and non-movable media, and may implement information storage by means of any method or technology. Information may be a computer readable instruction, a data structure, and a module of a program or other data. A storage medium of a computer includes, for example, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and may be used to store information accessed by the computing device. According to the definition of this text, the computer readable medium does not include transitory media, such as a modulated data signal and a carrier.

The example embodiments in the specification are described progressively, identical or similar parts of the example embodiments may be obtained with reference to each other, and each example embodiment emphasizes a part different from other example embodiments. Especially, the system example embodiment is basically similar to the method example embodiment, so it is described simply, and for related parts, reference may be made to the descriptions of the parts in the method example embodiment.

The present disclosure may be applied in numerous general-purpose or special-purpose computer system environments or configurations, for example: personal computers, server computers, handheld or portable devices, tablet-type devices, multiprocessor systems, microprocessor-based systems, set-top boxes, programmable consumer electronics, network PCs, minicomputers, mainframe computers, or distributed computing environments including any of the above systems or devices.

The present disclosure may be described in a common context of a computer executable instruction executed by a computer, for example, a program module. Generally, the program module includes a routine, a program, an object, an assembly, a data structure, and the like used for executing a specific task or implementing a specific abstract data type. The present disclosure may also be implemented in distributed computing environments, and in the distributed computer environments, a task is executed by using remote processing devices connected through a communications network. In the distributed computer environment, the program module may be located in local and remote computer storage media including a storage device.

Although the present disclosure is described through example embodiments, those of ordinary skill in the art should know that there are many variations and changes in the present disclosure without departing from the spirit of the application. It is intended that the appended claims include such variations and changes without departing from the spirit of the present disclosure.

The present disclosure may further be understood with clauses as follows.

Clause 1. A transcoding method comprising:

pre-establishing a correspondence between multiple different levels of definition and resolutions;

selecting a first definition and a second definition from the multiple levels of definition, and determining a first resolution and a second resolution that respectively correspond to the first definition and the second definition;

transcoding a first part of content of a media file based on the first resolution and the second resolution and according to a preset transcoding rule, and recording a first real-time quantization parameter (QP) value and a second real-time QP value that respectively correspond to the first definition and the second definition in a transcoding process;

determining whether the first real-time QP value and the second real-time QP value meet a preset detection rule;

adjusting the first resolution corresponding to the first definition if the first real-time QP value does not meet the preset detection rule; and/or adjusting the second resolution corresponding to the second definition if the second real-time QP value does not meet the preset detection rule; and transcoding a non-transcoded part in the media file according to an adjusted first resolution and/or an adjusted second resolution.

Clause 2. The transcoding method of clause 1, wherein the preset transcoding rule includes encoding according to a constant rate factor (CRF) value or a constant QP value.

Clause 3. The transcoding method of clause 2, wherein a first threshold is a QP value corresponding to the CRF value or the CRF value.

Clause 4. The transcoding method of clause 3, wherein when the preset transcoding rule is encoding according to the CRF value, the QP value is equal to the CRF value plus 5.

Clause 5. The transcoding method of clause 1, wherein the preset detection rule includes:

a number of QP values greater than a first threshold in real-time QP values obtained by transcoding based on a resolution is less than a % of a total number of the real-time QP values obtained by transcoding based on the resolution, a ranging from 30 to 70.

Clause 6. The transcoding method of clause 1, wherein the adjusting the first resolution includes multiplying a value of the first resolution by a first factor, the first factor being greater than 0 and less than 1.

Clause 7. The transcoding method of clause 1, wherein the adjusting the second resolution includes multiplying a value of the second resolution by a first factor, the first factor being greater than 0 and less than 1.

Clause 8. The transcoding method of clause 1, further comprising:

recording a first bit-rate and a second bit-rate that are obtained by transcoding the first part of content of the media file, the first bit-rate and the second bit-rate respectively corresponding to the first definition and the second definition; and establishing a linear model according to the first bit-rate and the second bit-rate that respectively correspond to the first definition and the second definition, and the first resolution and the second resolution.

Clause 9. The transcoding method of clause 8, wherein when the multiple levels of definition include at least three levels of definition, the method further comprises:

determining bit-rate values corresponding to other levels of definition except for the first definition and the second definition in the multiple levels of definition according to the linear model and resolutions corresponding to the other levels of definition.

Clause 10. The transcoding method of clause 8 or 9, further comprising:

determining whether a bit-rate value corresponding to a respective level of definition is less than or equal to a preset upper-limit bit-rate threshold corresponding to the respective level of definition;

if the determination result is no, determining a target level of definition of which a bit-rate value is greater than the upper-limit bit-rate threshold in the multiple levels of definition;

determining an adjusted resolution corresponding to the target level of definition by using the linear model and according to the upper-limit bit-rate threshold corresponding to the target level of definition; and transcoding the non-transcoded part in the media file according to the adjusted resolution.

Clause 11. The transcoding method of clause 1, wherein when the multiple levels of definition include at least three levels of definition, the selecting the first definition and the second definition from the multiple levels of definition includes: selecting any two levels of definition except a highest level of definition from the multiple levels of definition, as the first definition and the second definition.

Clause 12. The transcoding method of clause 11, wherein when the multiple levels of definition include four or more levels of definition, the selecting the first definition and the second definition from the multiple levels of definition include selecting two non-adjacent levels of definition as the first definition and the second definition.

Clause 13. The transcoding method of clause 1, wherein the first part of content of the media file includes a content lasting a first duration in the media file, the first duration being less than a total playback duration of the media file.

Clause 14. A transcoding apparatus comprising: a correspondence establishment module, a definition and resolution determining module, a transcoding module, a first determination module, and a first resolution adjusting module, wherein the correspondence establishment module is configured to establish a correspondence between multiple different levels of definition and resolutions;

the definition and resolution determining module is configured to select a first definition and a second definition from the multiple levels of definition, and determine a first resolution and a second resolution that respectively correspond to the first definition and the second definition;

the transcoding module is configured to transcode a first part of content of a media file based on the first resolution and the second resolution and according to a preset transcoding rule, and record a first real-time quantization parameter (QP) value and a second real-time QP value that respectively correspond to the first definition and the second definition in the transcoding process;

the first determination module is configured to determine whether the first real-time QP value and the second real-time QP value meet a preset detection rule, the preset detection rule including a number of QP values greater than a first threshold in real-time QP values obtained by transcoding based on a resolution being less than a % of a total number of the real-time QP values obtained by transcoding based on the resolution, a ranging from 30 to 70; and the first resolution adjusting module is configured to adjust a first resolution corresponding to the first definition if the determination result of the first determination module is that the first real-time QP value does not meet the preset detection rule; and/or adjust a second resolution corresponding to the second definition if the determination result of the first determination module is that the second real-time QP value does not meet the preset detection rule; and the transcoding module is further configured to transcode a non-transcoded part in the media file according to the first resolution and/or second resolution adjusted by the first resolution adjusting module.

Clause 15. The transcoding apparatus of clause 14, wherein the transcoding apparatus further comprises: a bit-rate recording module and a linear model establishment module, wherein the bit-rate recording module is configured to record a first bit-rate and a second bit-rate that are obtained after the transcoding module transcodes the first part of content of the media file, the first bit-rate and the second bit-rate respectively corresponding to the first definition and the second definition; and the linear model establishment module is configured to establish a linear model according to the first bit-rate and the second bit-rate that respectively correspond to the first definition and the second definition, and according to the first resolution and the second resolution.

Clause 16. The transcoding apparatus of clause 15, further comprising a module for determining other bit-rates configured to determine bit-rate values corresponding to other levels of definition except for the first definition and the second definition in the multiple levels of definition according to the linear model and resolutions corresponding to the other levels of definition.

Clause 17. The transcoding apparatus of clause 15, further comprising a second determination module configured to determine whether a bit-rate value corresponding to a respective level of definition is less than or equal to a preset upper-limit bit-rate threshold corresponding to the respective level of definition.

Clause 18. The transcoding apparatus of clause 17, wherein when the determination result of the second determination module is no, the transcoding apparatus further comprises a module for determining a target level of definition, and a second resolution adjustment module, wherein:

the module for determining a target level of definition is configured to determine a target level of definition of which a bit-rate value is greater than a corresponding preset upper-limit bit-rate threshold in the multiple levels of definition;

the second resolution adjustment module is configured to determine an adjusted resolution corresponding to the target level of definition by using the linear model and according to the upper-limit bit-rate threshold corresponding to the target level of definition; and correspondingly, the transcoding module is further configured to transcode the non-transcoded part in the media file according to the resolution adjusted by the second resolution adjustment module.

Clause 19. A transcoding method comprising:

selecting a first definition and a second definition from multiple levels of definition, and determining a first resolution and a second resolution that respectively correspond to the first definition and the second definition;

transcoding a first part of content of a media file based on the first resolution and the second resolution and according to a preset transcoding rule, and recording a first real-time quantization parameter (QP) value and a second real-time QP value that respectively correspond to the first definition and the second definition in the transcoding process;

determining whether the first real-time QP value and the second real-time QP value meet a preset detection rule;

adjusting a first resolution corresponding to the first definition if the first real-time QP value does not meet the preset detection rule; and/or adjusting a second resolution corresponding to the second definition if the second real-time QP value does not meet the preset detection rule; and transcoding a non-transcoded part in the media file according to the adjusted first resolution and/or second resolution.

Clause 20. A transcoding apparatus comprising: a definition and resolution determining module, a transcoding module, a first determination module, and a first resolution adjusting module, wherein:

the definition and resolution determining module is configured to select a first definition and a second definition from multiple levels of definition, and determine a first resolution and a second resolution that respectively correspond to the first definition and the second definition;

the transcoding module is configured to transcode a first part of content of a media file based on the first resolution and the second resolution and according to a preset transcoding rule, and record a first real-time quantization parameter (QP) value and a second real-time QP value that respectively correspond to the first definition and the second definition in the transcoding process;

the first determination module is configured to determine whether the first real-time QP value and the second real-time QP value meet a preset detection rule, the preset detection rule including a number of QP values greater than a first threshold in real-time QP values obtained by transcoding based on a resolution being less than a % of a total number of the real-time QP values obtained by transcoding based on the resolution, a ranging from 30 to 70;

the first resolution adjusting module is configured to adjust a first resolution corresponding to the first definition if the determination result of the first determination module is that the first real-time QP value does not meet the preset detection rule; and/or adjust a second resolution corresponding to the second definition if the determination result of the first determination module is that the second real-time QP value does not meet the preset detection rule; and the transcoding module is further configured to transcode the non-transcoded part in the media file according to the first resolution and/or second resolution adjusted by the first resolution adjusting module.

What is claimed is:

1. A method comprising:

selecting a first definition and a second definition from multiple levels of definition that correspond to multiple resolutions respectively;

determining, from the multiple resolutions, a first resolution and a second resolution that respectively correspond to the first definition and the second definition;

transcoding a first part of content of a media file based on the first resolution and the second resolution;

recording a first quantization parameter (QP) value and a second QP value that respectively correspond to the first definition and the second definition;

comparing the first QP value and the second QP value with a preset quality standard;

adjusting a first resolution corresponding to the first definition or a second resolution corresponding to the second definition according to a result of the comparing; and transcoding a non-transcoded part in the media file according to an adjusted first resolution or an adjusted second resolution.

2. The method of claim 1, wherein the first QP value and the second QP value are real time values.

3. The method of claim 1, wherein the recording the first QP value and the second QP value that respectively correspond to the first definition and the second definition including recording the first QP value and the second QP value that respectively correspond to the first definition and the second definition in a transcoding process.

4. The method of claim 1, wherein the transcoding the first part of content of the media file based on the first resolution and the second resolution including transcoding the first part of content of the media file based on the first resolution and the second resolution and according to a preset transcoding rule.

5. The method of claim 4, wherein the preset transcoding rule includes encoding according to a constant rate factor (CRF) value or a constant QP value.

6. The method of claim 1, wherein the first QP value measures a distortion degree and compression ratio of the transcoded media file.

7. The method of claim 1, wherein the comparing the first QP value and the second QP value with the preset quality standard includes determining that the first QP value or the second QP value does not meet a preset detection rule.

8. The method of claim 7, wherein the preset detection rule includes:

a number of QP values greater than a first threshold in real-time QP values obtained by transcoding based on a resolution.

9. The method of claim 8, wherein the first threshold includes an instantaneous bit-rate value in a transcoding process.

10. The method of claim 7, wherein the adjusting the first resolution corresponding to the first definition includes adjusting the first resolution corresponding to the first definition in response to determining that the first QP value does not meet the preset detection rule.

11. The method of claim 7, wherein the adjusting the second resolution corresponding to the second definition includes adjusting the second resolution corresponding to the second definition in response to determining that the second QP value does not meet the preset detection rule.

12. The method of claim 1, wherein:
the comparing the first QP value and the second QP value with the preset quality standard includes determining that the first QP value and the second QP value do meet a preset detection rule; and
the adjusting the first resolution corresponding to the first definition or the second resolution corresponding to the second definition includes keeping the first resolution and the second resolution.

13. The method of claim 1, wherein the transcoding the non-transcoded part in the media file according to the adjusted first resolution or the adjusted second resolution includes
recording a first bit-rate and a second bit-rate that are obtained by transcoding the first part of content of the media file, the first bit-rate and the second bit-rate respectively corresponding to the first definition and the second definition; and
establishing a linear model according to the first bit-rate and the second bit-rate that respectively correspond to the first definition and the second definition, the first resolution and the second resolution.

14. The method of claim 13, wherein:
the multiple levels of definition include at least three levels of definition including the first definition and the second definition.

15. The method of claim 14, further comprising:
determining bit-rate values corresponding to other levels of definition except for the first definition and the second definition in the multiple levels of definition according to the linear model and resolutions corresponding to the other levels of definition.

16. The method of claim 14, wherein the selecting the first definition and the second definition from the multiple levels of definition includes selecting any two levels of definition except a highest level of definition from the multiple levels of definition, as the first definition and the second definition.

17. The method of claim 13, wherein the multiple levels of definition include four or more levels of definition including the first definition and the second definition.

18. The method of claim 17, wherein the selecting the first definition and the second definition from the multiple levels of definition includes selecting two non-adjacent levels of definition as the first definition and the second definition.

19. A transcoding apparatus comprising:
one or more processors; and
one or more memories storing thereon computer-readable instructions that, when executed by the one or more processors, cause the one or more processors to perform acts comprising:
selecting a first definition and a second definition from multiple levels of definition that correspond to multiple resolutions respectively;
determining, from the multiple resolutions, a first resolution and a second resolution that respectively correspond to the first definition and the second definition;
transcoding a first part of content of a media file based on the first resolution and the second resolution and according to a preset transcoding rule;
recording a first real-time quantization parameter (QP) value and a second real-time QP value that respectively correspond to the first definition and the second definition in a transcoding process;
determining that the first real-time QP value or the second real-time QP value does not meet a preset detection rule;
adjusting the first resolution corresponding to the first definition in response to determining that the first real-time QP value does not meet the preset detection rule or adjusting the second resolution corresponding to the second definition in response to determining that the second real-time QP value does not meet the preset detection rule; and
transcoding a non-transcoded part in the media file according to an adjusted first resolution or an adjusted second resolution.

20. One or more memories storing thereon computer-readable instructions that, when executed by one or more processors, cause the one or more processors to perform acts comprising:
selecting a first definition and a second definition from multiple levels of definition that correspond to multiple resolutions respectively;
determining, from the multiple resolutions, a first resolution and a second resolution that respectively correspond to the first definition and the second definition;
transcoding a first part of content of a media file based on the first resolution and the second resolution and according to a preset transcoding rule;
recording a first real-time quantization parameter (QP) value and a second real-time QP value that respectively correspond to the first definition and the second definition in a transcoding process;
determining that the first real-time QP value or the second real-time QP value does meet a preset detection rule; and
transcoding a non-transcoded part in the media file according to the first resolution and the second resolution.

* * * * *